US012683460B2

(12) United States Patent
Muth

(10) Patent No.: US 12,683,460 B2
(45) Date of Patent: Jul. 14, 2026

(54) ENGINE OR DRIVEN MACHINE

(71) Applicant: AEROLAS GMBH AEROSTATISCHE LAGER—LASERTECHNIK, Unterhaching (DE)

(72) Inventor: Michael Muth, Egmating (DE)

(73) Assignee: AEROLAS GMBH AEROSTATISCHE LAGER—LASERTECHNIK, Unterhaching (DE)

( * ) Notice: Subject to any disclaimer, the term of this patent is extended or adjusted under 35 U.S.C. 154(b) by 537 days.

(21) Appl. No.: 18/197,136

(22) Filed: May 15, 2023

(65) Prior Publication Data

US 2023/0369938 A1     Nov. 16, 2023

Related U.S. Application Data

(63) Continuation of application No. PCT/EP2021/081704, filed on Nov. 15, 2021.

(30) Foreign Application Priority Data

Nov. 16, 2020     (DE) ......................... 102020130125.1

(51) Int. Cl.
*H02K 7/08*          (2006.01)
*H02K 1/278*          (2022.01)
*H02K 7/14*          (2006.01)
(52) U.S. Cl.
CPC .............. *H02K 7/08* (2013.01); *H02K 1/278* (2013.01); *H02K 7/14* (2013.01); *H02K 2201/03* (2013.01)

(58) Field of Classification Search
CPC ............ H02K 7/08; H02K 1/278; H02K 7/14; H02K 2201/03
See application file for complete search history.

(56) References Cited

U.S. PATENT DOCUMENTS 6,344,703 B1 *     2/2002     Sawada ................. H02K 7/088
                                                        310/90
7,548,387 B2     6/2009     Rassel et al.
                            (Continued)

FOREIGN PATENT DOCUMENTS

CA          2766265 A1     12/2010
CH          557481 A     12/1974
                (Continued)

*Primary Examiner* — Terrance L Kenerly
(74) *Attorney, Agent, or Firm* — VON ROHRSCHEIDT PATENTS

(57) ABSTRACT

An electric motor or driven machine including a structure; a stator device fixed at the structure; a rotor device including an outer circumference; and a rotor shaft coupled or couplable to the rotor device for torque transmission and supported rotatable about an axis of rotation and substantially axially fixed in or on the structure, wherein the rotor device is axially supported proximal to its outer circumference in an axis-parallel direction by an aerostatic bearing including a stator-side bearing surface formed on the stator device and a rotor-side bearing surface formed on the rotor device and a bearing gap formed between the stator side bearing surface and the rotor side bearing surface, wherein the rotor device is formed by a rotor disc, wherein circumferentially spaced and radially extending permanent magnets of an electromagnetic operating device are provided at the rotor disk, radially inside from the aerostatic bearing.

13 Claims, 5 Drawing Sheets

(56)     References Cited

U.S. PATENT DOCUMENTS

| | | | | |
|---|---|---|---|---|
| 8,714,075 | B2 * | 5/2014 | Giacchi | B23K 26/389 |
| | | | | 92/DIG. 2 |
| 10,594,181 | B2 * | 3/2020 | Sim | H02K 17/16 |
| 2018/0209479 | A1 * | 7/2018 | Mook | F16C 43/02 |
| 2021/0111599 | A1 * | 4/2021 | Mitri | H02K 1/30 |

FOREIGN PATENT DOCUMENTS

| | | | | |
|---|---|---|---|---|
| DE | 2433712 | A1 | 1/1976 | |
| DE | 102006036707 | B3 | 2/2008 | |
| DE | 102007028905 | B3 | 12/2008 | |
| DE | 102011080239 | A1 | 2/2013 | |
| DE | 102016214700 | A1 | 2/2018 | |
| DE | 102018010149 | A1 | 7/2019 | |
| EP | 2667485 | B1 | 11/2014 | |
| EP | 2985893 | A1 | 2/2016 | |
| FR | 2024704 | A5 | 8/1970 | |
| GB | 936072 | * | 10/1960 | F16C 32/0614 |
| GB | 936072 | A | 9/1963 | |
| GB | 1470462 | A | 4/1977 | |
| GB | 2483495 | A | 3/2012 | |

* cited by examiner

ENGINE OR DRIVEN MACHINE

RELATED APPLICATIONS

This application is a continuation of International Patent Application PCT/EP2021/081704 filed on Nov. 15, 2021 claiming priority from German Patent Application DE 10 2020 130 125.1 filed on Nov. 16, 2020, both of which are incorporated in their entirety by this reference.

FIELD OF THE INVENTION

The present invention relates to an engine or a driven machine having at least one stator device and at least one rotor device wherein the at least one stator device is fixed at a structure, the at least one rotor device includes an outer circumference, and a rotor shaft coupled or couplable to the at least one rotor device for torque transmission and supported rotatable about an axis of rotation and substantially axially fixed in or on the structure. The at least one rotor device is axially supported proximal to its outer circumference in an axis-parallel direction by an aerostatic bearing including a stator-side bearing surface formed on the at least one stator device and a rotor-side bearing surface formed on the at least one rotor device and a bearing gap formed between the stator side bearing surface and the rotor side bearing surface. In particular, the invention relates to a gas turbine and, more advantageously, to a jet engine, for example a jet engine of an aircraft.

BACKGROUND OF THE INVENTION

Engines (prime movers) and driven machines (working machines) that are intended to produce a large output often have rotor devices of large diameter. These rotor devices can start to flutter during operation, especially at high speeds, which means that the rotational motion of the rotor device is superimposed by an alternating axial motion whose amplitude increases with increasing radius. In order to avoid such fluttering, an attempt can be made to design the corresponding rotor device to be very stiff, but this has the effect of significantly increasing the mass of the rotor device, which in turn increases the inertia of the engine or driven machine. However, the increase in inertia is often undesirable.

Such problems occur particularly often in electric disc motors, which are also known as axial flux motors. There, a rotating disk is provided in or on which permanent magnets are provided spaced apart from one another in the circumferential direction and located radially far out. Opposite this rotor disk in the axial direction is a stator with electrical windings, to the electrical windings of which an alternating current is applied. This alternating current induces an electromagnetic alternating field circulating in the circumferential direction, which causes the rotor disk provided with the permanent magnets to rotate. The further radially out the permanent magnets are arranged, the greater is the torque that can be generated with this axial flux motor, which is dissipated via an axial shaft connected to the rotor disk.

The alternating magnetic flux between the stator and the rotor generates axial forces whose direction of force changes with the alternating electromagnetic field, so that the rotor disk is subjected to constantly changing bending forces which are greater the further the permanent magnets and the stator coil opposite them are radially spaced apart from the axis of rotation. The resulting bending oscillation of the rotor disk causes the perceptible flutter and causes the distance between the stator and the rotor disk to change periodically, which in turn has an affect on the electromagnetic forces acting between the stator and the rotor. Since the rotor disk cannot be made arbitrarily thick (in the axial direction) to increase its rigidity, the radius on which the permanent magnets can be placed on the rotor disk is limited in its extension from the axis of rotation. This also limits the achievable torque of such an axial flux motor.

Another application of such an engine or driven machine is in a compressor impeller of an aircraft turbine or generally a gas turbine, where it is also desired to achieve a high torque over a large radius. Here, the problem of fluttering of the individual turbine blades occurs, which are only supported in the area of the hub. In this case, the axial forces are generated by the incoming air, which exerts a bending moment on the respective turbine blade. Since the turbine blades cannot be manufactured as solid and rigid as desired either, because otherwise the rotating mass would be too large, and the radius is also limited here. This problem arises, in particular, in aircraft jet engines, especially if they are designed as fan engines with one or more large-diameter compressor impellers.

DE 10 2006 036 707 B3 describes a low-inertia electric direct drive in the form of an axial flux motor. The mechanical bearing of the rotor relative to the stator is provided by ball bearings, which are provided radially inside or radially outside the rotor. The precision of such ball bearings as large-diameter rotational bearings is very limited with regard to the support of axial forces, so that fluttering of a rotating disk supported by means of such a ball bearing cannot be avoided.

An axial flux motor is known from EP 2 667 485 B1, which has an annular rotor disk connected to the rotor axis via a flexible rotor diaphragm. The annular rotor disk is supported in the axial direction via axial bearings designed as ball bearings in the area of the circumference of the annular rotor disk. Apart from the fact that such thrust ball bearings are heavy for large diameters, their precision in the axial direction is also limited.

DE 10 2007 028 905 B3 shows and describes a bearing device for contact-free mounting of a rotor mechanically connected to a rotor shaft against a stator, in which the rotor is provided with annular projections spaced apart radially from one another and extending in the circumferential direction. Each of these rotor-side annular projections is assigned a circumferentially extending stator-side annular projection. Air outlets are provided in the region of the stator-side annular projections, through which air can enter the gap between stator and rotor. In this case, a flat air gap which remains constant in the axial extension cannot be formed for the bearing of the rotor relative to the stator. Alternatively, the rotor shaft can be provided with an axially acting air bearing on the end face.

EP 2 985 893 A1 shows and describes an electric machine with air gap control, the machine having at least one stator and one rotor. The stator contains at least two stator segments, which are arranged next to each other in the axial direction. Both stator segments are designed to be movable relative to the rotor axis in the axial direction. Each stator segment is assigned a rotor disk which covers the stator segments on an axial end face. The stator segments have annular regions in which so-called stator teeth are arranged. In the radial direction, a circular-segment-shaped raised area (projection) is formed between each two of these areas provided with the stator teeth, in which a row of circular-segment-shaped air outlet nozzles is located. These air outlet nozzles are aligned in such a way that the compressed air exiting from them presses against a corresponding surface of the rotor disk. This repulsive force of the compressed air is opposed by a magnetic attraction force between the stator teeth and the rotor disk. If the compressive force exerted by the compressed air is greater than the magnetic attractive force, the stator segment is moved away from the rotor disk and the air gap between the stator segment and the rotor disk is increased. In this way, by adjusting the pressure of the air exiting the compressed air nozzles, the motor air gap between the stator segment and the rotor disk can be kept constant. The stator-side bearing surface provided with the compressed air nozzles is not fixed to the system, but can be moved in the axial direction. This is to compensate for unevenness of the rotor by axial tracking of the stator segment so that the air gap always remains constant. The aim of keeping the air gap constant is for electrodynamic reasons. The air gap here is not a bearing gap and the air outlet nozzles do not form an air bearing for the rotor disk.

Another problem of large diameter rolling bearings (ball bearings and roller bearings) is that the circumferential speed of the rolling elements (balls, rollers) rotating in operation increases with increasing bearing diameter and thus the maximum bearing diameter of a rolling bearing is limited by the maximum circumferential speed of the rolling elements.

BRIEF SUMMARY OF THE INVENTION

It is therefore an object of the present invention to improve a generic engine or driven machine in such a way that precise concentricity without axial flutter is ensured even with a large diameter.

This object is achieved by the engine or driven machine including a structure, a stator device fixed at the structure, a rotor device including an outer circumference, and a rotor shaft coupled or couplable to the rotor device for torque transmission and supported rotatable about an axis of rotation and substantially axially fixed in or on the structure, wherein the rotor device is axially supported proximal to its outer circumference in an axis-parallel direction by an aerostatic bearing including a stator-side bearing surface formed on the stator device and a rotor-side bearing surface formed on the rotor device and a bearing gap formed between the stator side bearing surface and the rotor side bearing surface, wherein the rotor device is formed by a rotor disc, wherein circumferentially spaced and radially extending permanent magnets of an electromagnetic operating device are provided at the rotor disk, radially inside from the aerostatic bearing, and wherein electrical windings of the electromagnetic active device are provided in the stator device and configured to interact with the permanent magnets provided at the rotor disc.

An engine or driven machine having a structure, at least one structurally fixed stator device and at least one rotor device as well as at least one rotor shaft which is coupled or can be coupled to the rotor device for torque transmission and is rotatable about an axis of rotation and which is supported rotatably and substantially axially fixed in or on the structure, is characterized in accordance with the invention in that the rotor device is axially supported on its outer circumference or in the region of its outer circumference in the axis-parallel direction by means of at least one aerostatic bearing which has at least one structurally fixed stator-side bearing surface formed on the stator device and at least one rotor-side bearing surface formed on the rotor device, between which a bearing gap is formed. The stator device is connected to the structure, for example, or forms part of the structure and is structurally fixed in this way. Both the at least one stator-side bearing surface and the at least one rotor-side bearing surface are advantageously flat.

Substantially axially fixed here means that the rotor shaft is axially fixed and can at most be axially movable within the usual tolerances of a radial bearing or a so-called floating bearing.

A structure of the engine or driven machine is understood as to be a body or a plurality of interconnected bodies that form a static part of the engine or driven machine within the engine or driven machine. For example, the structure may be formed by a machine housing, a structural framework or a structural frame of the engine or driven machine. The structure advantageously also serves to support the engine or driven machine on an external body, for which purpose the structure is connected or connectable to the external body.

The term "structurally fixed" is to be understood here as meaning that rotating and/or axially movable parts of the engine or driven machine can execute their movements relative to non-movable, structurally fixed parts of the engine or driven machine. This does not exclude that the engine or driven machine and thus its structure itself is movable relative to external bodies.

The aerostatic bearing is advantageously a gas pressure bearing such as an air bearing, in particular a high load capacity air bearing with micro-holes as air outlet nozzles.

The engine or driven machine according to the invention has, in the region of the outer circumference of its respective (at least one) rotor device, at least one aerostatic bearing extending annularly along the (advantageously entire) circumference of the rotor device in question, which supports the axial forces acting externally on the rotor device in the region of the outer circumference, namely where the mechanical lever (starting from the axis of rotation as viewed in the radial direction) is particularly long. External axis-parallel forces acting on the rotor device between the axis of rotation and the annular aerostatic bearing can therefore not generate axial vibrations in the region of the circumference of the rotor device, so that fluttering of the rotor device in the axial direction is prevented. The aerostatic bearing extending annularly along the circumference of the rotor device in question can have a self-contained annular bearing surface, but the bearing surface can also be interrupted along the circumference and thereby segmented.

The inherently low mass of an aerostatic bearing (for example compared to a rolling bearing acting in the area of the circumferential edge of the rotor device) results in a low weight of the annular bearing arrangement, whereby the support radius can be positioned significantly further radially outward in the axial direction than is reasonably possible with a rolling bearing without increasing the weight of the entire engine or driven machine to an unacceptable level. In addition, aerostatic bearings are not subject to the aforementioned diameter limitation that occurs in rolling bearings with respect to bearing diameter due to the maximum circumferential speed of the rolling elements.

Further advantageous features of the engine or driven machine according to the invention include the following. The stator side bearing surface or the rotor side bearing surface may include a plurality of gas outlet nozzles formed as micro-holes which open into the bearing gap. The stator-side bearing surface may include a plurality of gas outlet nozzles formed as micro-holes which open into the bearing gap. The stator-side bearing surface and the rotor-side bearing surface are each arranged in a plane orthogonal to the axis of rotation. The stator-side bearing surface and the rotor-side bearing surface may be each arranged in a plane which extends at an acute angle relative to the axis of rotation. The rotor device may include a first rotor-side bearing surface on a first axial side of the rotor device and a second rotor-side bearing surface on a second axial side of the rotor device facing away from the first axial side, wherein the first stator-side bearing surface is arranged opposite the rotor-side bearing surface, wherein a first bearing gap is formed between the rotor-side bearing surface and the stator-side bearing surface, and wherein the second stator-side bearing surface is arranged opposite the second rotor-side bearing surface, wherein a second bearing gap is formed between the second rotor-side bearing surface and the second stator-side bearing surface. The first stator-side bearing surface or the second stator-side bearing surface may be movable in the direction parallel to the axis or includes bearing elements which are movable in the direction parallel to the axis. The first stator side bearing surface, the second stator side bearing surface, the first rotor side bearing and the second rotor side bearing surface may be each aligned parallel to one another. The rotor device may be axially supported only proximal to its outer circumference by the aerostatic bearing and may be supported axially movable relative to the rotor shaft. The rotor device may be coupled to the rotor shaft torque proof by a coupling so that the rotor device is movable in the axial direction parallel to the axis of rotation or in the radial direction at right angles relative to the axis of rotation. The electric motor or driven machine may form an electric axial flux motor or an electric axial flux generator.

Still further advantageous features of the engine or driven machine according to the invention include the following. An engine or driven machine, including a structure, a stator device fixed at the structure, a rotor device including an outer circumference, and a rotor shaft coupled or couplable to the rotor device for torque transmission and supported rotatable about an axis of rotation and substantially axially fixed in or on the structure, wherein the rotor device is axially supported proximal to its outer circumference in an axis-parallel direction by an aerostatic bearing including a stator-side bearing surface formed on the stator device and a rotor-side bearing surface formed on the rotor device and a bearing gap formed between the stator side bearing surface and the rotor side bearing surface, wherein the rotor device is formed by an impeller of a turbine, which includes a multiplicity of turbine blades which extend in the radial direction and are mounted to or supported on a hub rotatably coupled to the rotor shaft, wherein radially outer end sections of the turbine blades are connected or coupled to a bearing ring including the rotor-side bearing surface, or wherein radially outer end sections of the turbine blades are provided with at least one bearing surface portion including the rotor-side bearing surface. The rotor device may be formed by a compressor rotor of a gas turbine or an aircraft turbine. A plurality of pairs of stators and rotors arranged one behind the other in the axial direction may also be included wherein at least one of the rotors is coupled to the rotor shaft for torque transmission and wherein at least one of the rotors is coupled to an additional rotor shaft for torque transmission.

Advantageously, the aerostatic bearing has at least one stator-side bearing surface formed on the stator device and at least one rotor-side bearing surface formed on the rotor device, between which a bearing gap is formed, a plurality of gas outlet nozzles formed as microholes being provided in at least one of the bearing surfaces and opening into the bearing gap. The multiplicity of gas outlet nozzles formed by microholes and an extremely thin bearing gap (for example, between 5 μm and 35 μm, advantageously between 10 μm and 20 μm) ensure a very high bearing rigidity and thus a high precision of the aerostatic bearing. This size of the bearing gap is measured at right angles to the respective bearing surface.

It is advantageous if the microholes forming the gas outlet nozzles are formed in the at least one bearing surface on the stator side. However, in other embodiments it also can be advantageous to provide the microholes forming the gas outlet nozzles in the at least one bearing surface on the rotor side.

The microholes are holes made in the bearing surface wall by means of a high-energy beam, for example by means of a laser beam, with a respective outlet diameter of the gas outlet nozzle thus formed in the bearing surface of between 15 μm and 150 μm, advantageously between 15 μm and 50 μm, advantageously between 20 μm and 35 μm, more advantageously between 25 μm and 30 μm.

It is also advantageous if the at least one stator-side bearing surface and the at least one rotor-side bearing surface each run in a plane perpendicular to the axis of rotation. This embodiment allows maximum support of forces acting axially parallel on the rotor device.

Alternatively, it can be advantageous if the at least one stator-side bearing surface and the at least one rotor-side bearing surface each run in a plane that runs at an acute angle to the axis of rotation. In this case, not only forces acting axially parallel on the rotor device but also radial forces can be supported.

An advantageous embodiment of the invention, which can be combined with other embodiments, provides that the rotor device has at least one first rotor-side bearing surface on a first axial end face of the rotor device and at least one second rotor-side bearing surface on a second axial end face of the rotor device facing away from the first axial end face, in that at least one first stator-side bearing surface is located opposite the at least one first rotor-side bearing surface, at least one first bearing gap being formed between the at least one first rotor-side bearing surface and the at least one first stator-side bearing surface, and in that at least one second stator-side bearing surface is located opposite the at least one second rotor-side bearing surface, at least one second bearing gap being formed between the at least one second rotor-side bearing surface and the at least one second stator-side bearing surface. This variant enables a "floating" axial bearing of the rotor device with a support of axis-parallel forces in both directions and exhibits improved damping properties of the bearing. The second bearing gap advantageously has the same properties as the first bearing gap and the thickness of the second bearing gap is, in particular, in the same range as that of the first bearing gap.

It is advantageous if the at least one first or second stator-side bearing surface is movable in the direction parallel to the axis or has bearing elements movable in the direction parallel to the axis. This axial movability of the at least one annular bearing element on one of the two bearing sides means the respective bearing gap can be kept constantly thin, whereby the bearing stiffness remains high.

Advantageously, the first and second bearing surfaces are each aligned parallel to each other.

Particularly advantageous is an embodiment of the invention which also can be combined with other embodiments and in which the rotor device is supported axially fixed only at its outer circumference or in the region of its outer circumference in the axis-parallel direction at least one aerostatic bearing and is supported axially movable relative to the rotor shaft. In this embodiment, the rotor device is supported axially fixed exclusively in the region of its largest diameter, and the mounting on or on the rotor shaft, for example in the region of the center of the rotor device, permits at least slight movability relative to the rotor shaft in the axial direction. The coupling between the rotor shaft and the rotor device is therefore fixed only in the circumferential direction, advantageously only in the main direction of rotation of the rotor device. Such a main direction of rotation is, for example, that direction of rotation in which the rotor shaft and the rotor device rotate in normal working operation, for example in forward running of a turbine.

Another advantageous embodiment of the invention, which can also be combined with other embodiments, provides that the rotor device is coupled to the rotor shaft for torque transmission by means of an associated coupling in such a way that the rotor device is movable in the axial direction parallel to the axis of rotation and/or in the radial direction at right angles to the axis of rotation. Here, the coupling enables relative mobility between the rotor shaft and the rotor device in the axial direction and/or in the radial direction and decouples the rotor device from the rotor shaft except for coupling in the direction of rotation. This creates an exclusively torque-resistant coupling.

In another advantageous embodiment of the invention, the rotor device is formed by a rotor disc of an electric motor, advantageously an axial flux motor.

Advantageously, the rotor disc is a magnetic rotor disc of the electric motor provided with radially arranged permanent magnets. This embodiment allows the "flutter-free" design of axial flux motors with a large diameter of the rotor device and thus with high torque with simultaneously low mass and (in axial direction) narrow design, since the rotor device can be very light and very thin in axial direction.

In an another advantageous embodiment of the invention, the rotor device is formed by an impeller, for example a compressor wheel, of a turbine, advantageously a drive turbine. Such a drive turbine is, for example, a fan engine or turbofan engine for an aircraft. This application allows the construction of turbine fans with a large diameter and an associated high compressor power.

In this context, it is advantageous if the impeller has a plurality of turbine blades extending in the radial direction, which are mounted to or supported on a hub coupled to and rotatable with the rotor shaft, and if the turbine blades are connected or coupled at their radially outer end portions to a bearing ring having the at least one rotor-side bearing surface.

In the embodiment of the rotor device having a circumferential outer peripheral region with at least one uninterrupted rotor-side bearing surface, the associated stator-side bearing surface may be interrupted and have, for example, circumferentially spaced stator-side bearing pads each having a bearing surface portion.

Alternatively, the impeller has a plurality of radially extending turbine blades mounted to or supported on a hub coupled to and rotatable with the rotor shaft, and the turbine blades are provided at a respective radially outer end portion with at least one rotor-side bearing surface portion. In this embodiment, the at least one rotor-side bearing surface is formed by the plurality of circumferentially spaced bearing surface portions of the individual turbine blades, and the associated at least one stator-side bearing surface is formed as a closed stator-side bearing ring.

An engine or driven machine according to the invention is advantageous, in which a plurality of pairs of stator devices and rotor devices are provided, which are arranged one behind the other in the axial direction and are designed according to the invention, wherein at least some of the rotor devices are coupled to the rotor shaft for torque transmission and wherein advantageously some of the rotor devices are coupled to a further rotor shaft for torque transmission. The small overall length (in the axial direction) of the engine or driven machine according to the invention with a simultaneously large diameter makes it possible to arrange a plurality of these engines and/or driven machines one behind the other in the axial direction and thus to construct a compact and at the same time powerful engine and/or driven machine arrangement. The individual engine and/or driven machines arranged one behind the other can be coupled by means of a common rotor shaft or they can be coupled to different rotor shafts, of which at least one rotor shaft coupled to a first engine or driven machine is designed as a hollow shaft in which a further rotor shaft is supported rotatably relative thereto, which is coupled to another engine or driven machine.

BRIEF DESCRIPTION OF THE DRAWINGS

Exemplary embodiments of the invention are described and explained in more detail below with reference to the accompanying drawing figures, wherein.

DETAILED DESCRIPTION OF THE INVENTION

Figures 1, 1A, 1B:
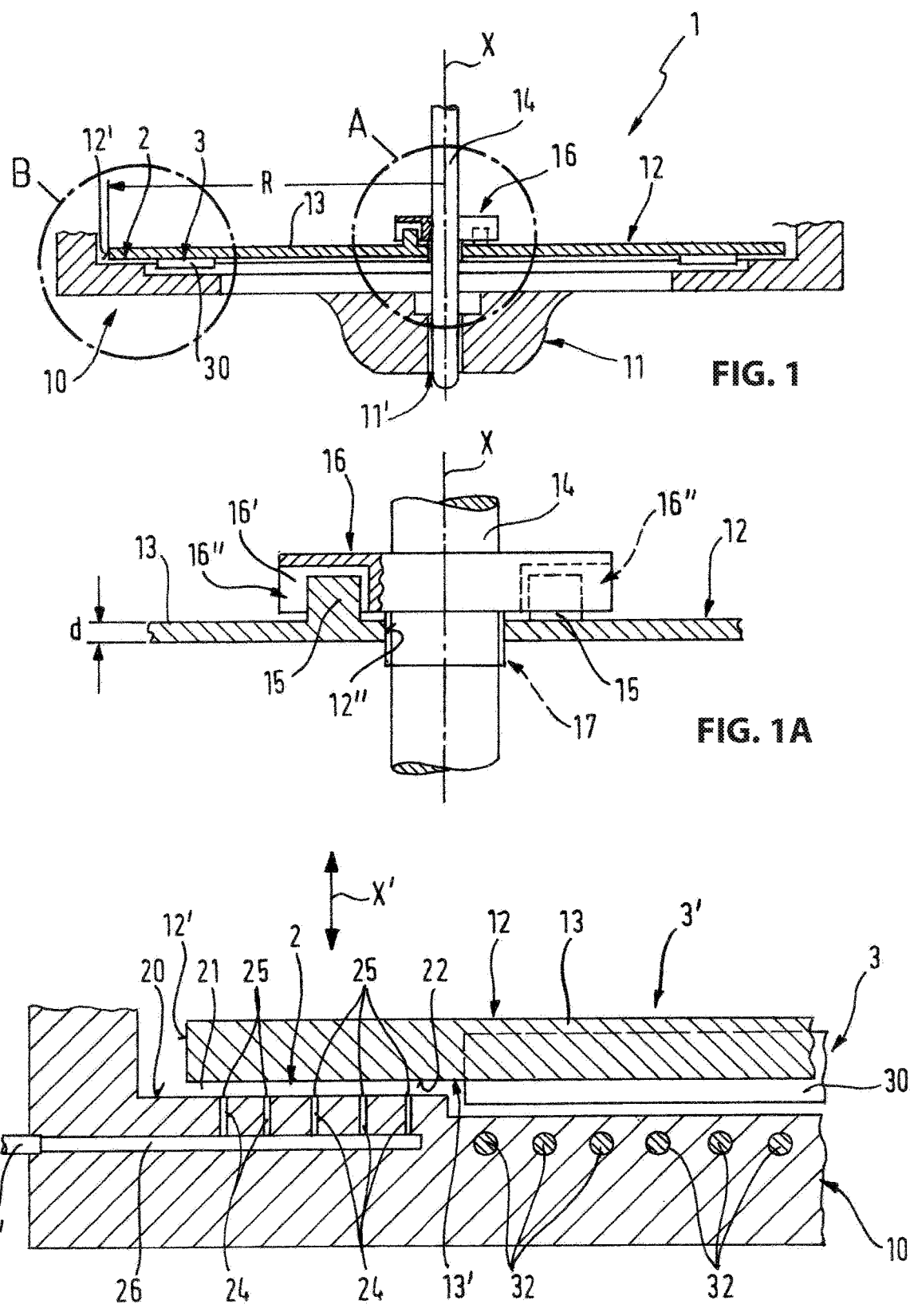
FIG. 1 a schematic diagram of the mechanical principle of the invention based on a first variant of a first exemplary application of the inventive principle to the rotor of an axial flux electric motor.

FIG. 1 shows a schematic diagram of the mechanical principle of the invention. An engine or driven machine 1 has a stator device 10 and a rotor device 12, which is coupled in a rotationally fixed, e.g. torque-resistant, manner to a rotor shaft 14 which is rotatable about a rotational axis X. The rotor shaft 14 is rotatably supported in or on a structure 11 of the engine or driven machine 1, shown only schematically in the figures, by means of a rotational bearing 11' designed, for example, as a radial bearing. The stator device 10 is also fixedly connected to the structure 11 or forms part of the structure 11; the stator device 10 is therefore structurally fixed. Such a structure 11 may, for example, be formed by a machine housing, a structural framework or a structural frame of the engine or driven machine 1. The structure 11 advantageously also serves to support the engine or driven machine 1 on an external body, for which purpose the structure 11 is connected to the external body.

The rotor device 12 has a rotor disk 13 which extends in a plane perpendicular to the axis of rotation X. The thickness d of the rotor disk 13 measured in the axial direction is many times smaller than the radius R of the rotor disk 13.

The rotor device 12 is supported on the rotor shaft 14 so as to be displaceable relative to the rotor shaft 14 in the axial direction of the axis of rotation X and is coupled to the rotor shaft 14 in a torque-resistant manner, for example, via a claw coupling 16 (detail A). The claw coupling 16 is connected to the rotor shaft 14 in a rotationally fixed manner and has a plurality of claws 16' extending radially outwardly from the rotor shaft 14, which form claw pockets 16" distributed uniformly over the circumference and advantageously open outwardly in the radial direction. Claw pins 15 formed on or connected to the rotor disc 13 engage in these claw pockets 16", which are provided in the region of the inner circumference 12" of the rotor device 12 and extend from the rotor disc 13 in the axial direction. The claw pins 15 engage the claws 16' of the claw coupling 16, thereby providing the rotationally fixed connection between the rotor shaft 14 and the rotor device 12. Both in the axial direction and in the radial direction, the claw pins 15 are movable in the claw pockets 16" relative to the claws 16'. Thus, the claw coupling 16 has one axial degree of freedom and one radial degree of freedom and is designed to be only torque-resistant. In addition, when the coupling is torque-resistant, the rotor device 12 can be tilted relative to the axis of rotation X by a few angular degrees out of the plane extending at right angles to the axis of rotation X.

Another variant of a torque-resistant but axially and radially movable and tiltable coupling of the rotating device to the rotor shaft is the provision of a so-called flex coupling, which is torque-resistant but otherwise flexible.

Alternatively, the rotor device 12 can also be coupled to the rotor shaft 14 in an axially movable but rotationally fixed manner via an axial toothing 17, but the claw coupling 16 has the advantage that it also allows radial play due to its inherent radial degree of freedom.

The rotor device 12 is axially supported in the area of its outer circumference 12' by means of an aerostatic bearing 2 formed on the stator device 10 in the axis-parallel direction X'. Radially within the aerostatic bearing 2, a plurality of circumferentially spaced and radially extending permanent magnets 30 of an electromagnetic active device 3 are provided on the rotor disk 13 of the rotor device 12. The permanent magnets 30 of the electromagnetic active device 3 interact with electrical windings 32 (detail B) provided in the stator device 10. The electromagnetic active device 3 can form either—in the case of an engine—an axial flux electric motor or—in the case of a driven machine—an axial flux generator. In the example shown, it is an axial flux electric motor 3'.

The aerostatic bearing 2 is designed as a gas pressure bearing, which in the example shown is operated with compressed air, thus forming an air bearing. The aerostatic bearing has an annular stator-side bearing surface 20 formed on the stator device 10 and an annular rotor-side bearing surface 22 adjacent to the outer circumference 12' of the rotor device 12 and provided on the end face 13' of the rotor disk 13 facing the stator-side bearing surface 20. A thin bearing gap 21 is formed between the stator-side bearing surface 20 and the rotor-side bearing surface 22.

A plurality of micro-holes 24 spaced apart from one another in the radial direction and in the circumferential direction are provided in the stator-side bearing surface 20, which micro-holes extend as bores from the stator-side bearing surface 20 to a compressed gas channel arrangement 26 provided in the interior of the stator device 10. The micro-holes opening into the bearing gap 21 form gas outlet nozzles 25 for a pressurized gas, which is introduced through a pressurized gas line 26' into the pressurized gas channel arrangement 26 and from there through the micro-holes 24 into the bearing gap 21. The pressurized gas introduced into the bearing gap 21 forms a pressurized gas cushion in the bearing gap, for example an air pressure cushion, on which the rotor disk 13 of the rotor device 12 floats relative to the stator device 10. The compressed gas force prevailing in the bearing gap 21, which strives to push the rotor disk 13 away from the stator device 10, is counteracted by the attractive force between the rotor disk 13 and the stator device 10 generated in the electromagnetic active device 3 by the permanent magnets 30, so that the rotor disk 13 of the rotor device 12 can rotate relative to the stator device 10 without contact and thus almost without friction.

However, the invention is not limited to the above-described spatially separated (radial) arrangement of the bearing surface(s) of the aerostatic bearing 2 and the plurality of circumferentially spaced and radially extending permanent magnets 30 of the electromagnetic effect device 3. The permanent magnets 30 may also be provided in one of the bearing surfaces 20, 22 of the aerostatic bearing 2, in which case micro-holes 24, 24' forming gas outlet nozzles 25, 25' may be provided in the radial webs formed between two circumferentially adjacent permanent magnets 30.

Figure 2:
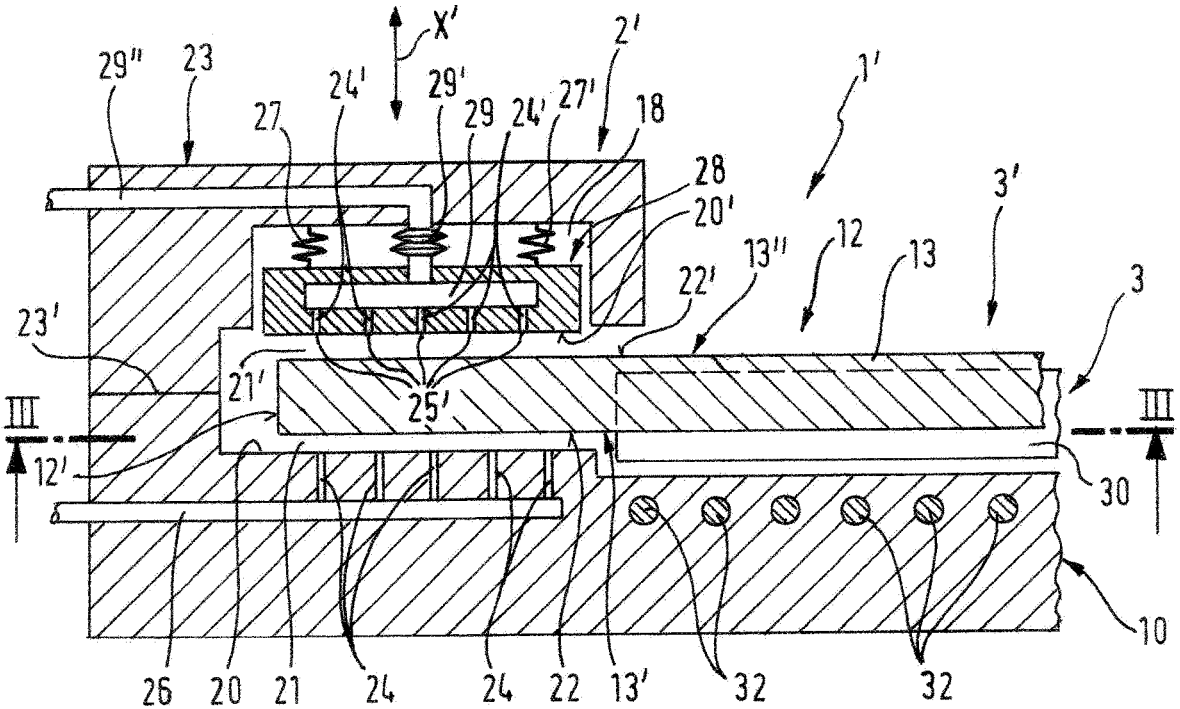
FIG. 2 a second variant of the first exemplary application of the inventive principle to the rotor of an axial flux electric motor.
Figure 3:
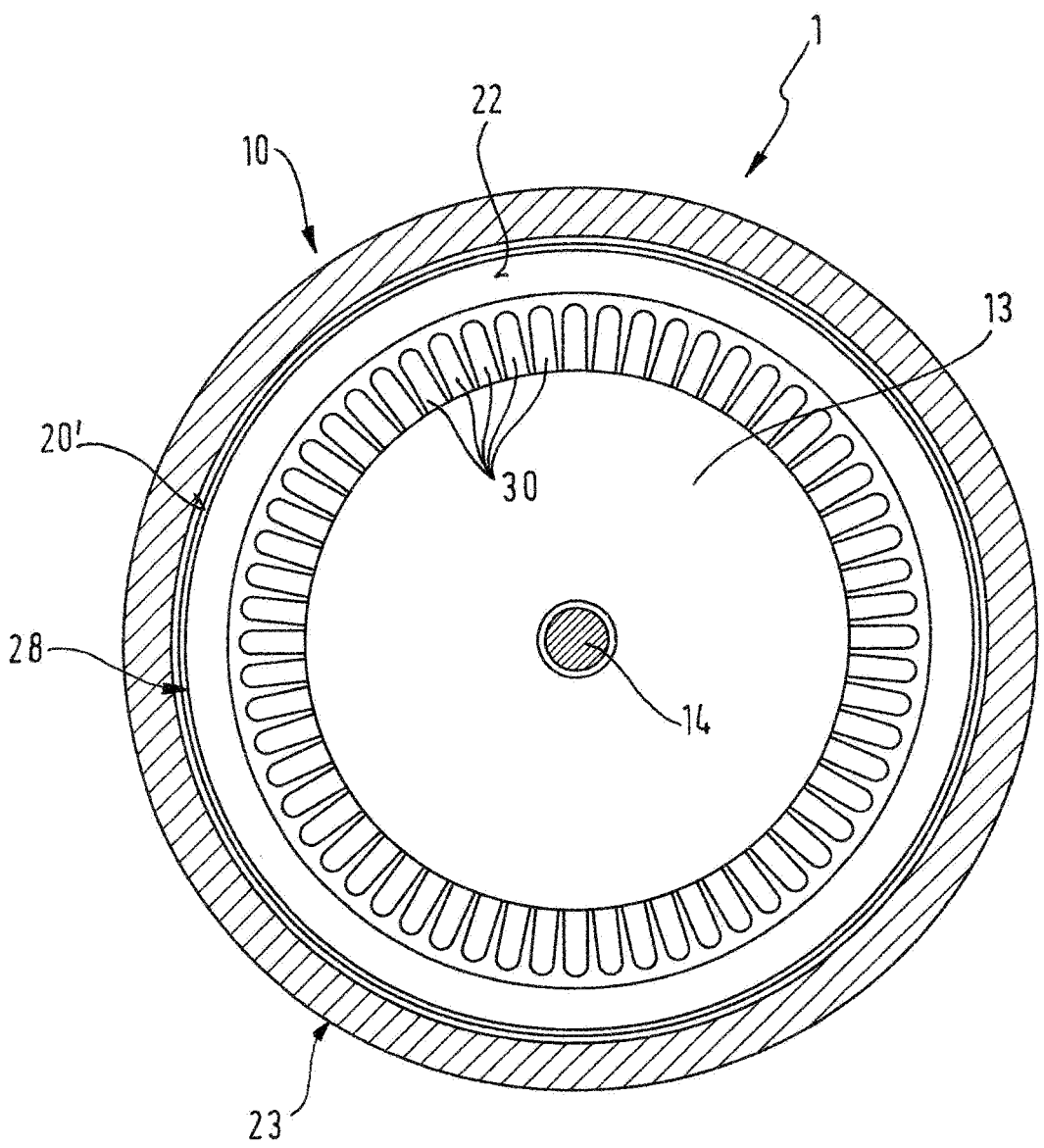
FIG. 3 a partially cut front view of the second variant along line III-III in FIG. 2.

FIG. 2 shows a modified variant of an aerostatic bearing 2' in the engine or driven machine 1 of FIG. 1, in which the stator head 23 is U-shaped in cross-section and embraces the peripheral edge region of the rotor disc 13. To facilitate assembly, the U-shaped stator head 23 can be designed to be divisible, as symbolically indicated by the line 23' in FIG. 2. FIG. 3 shows a sectional plan view of the engine or driven machine 1 of FIG. 2 in the direction of arrows III-III.

In addition to the pairing of the stator-side bearing surface 20 and the rotor-side bearing surface 22 provided on the first end face 13' of the rotor disk 13, which define the bearing gap 21 between them, described in connection with FIG. 1, a second rotor-side bearing surface 22' is provided on the second end face 13" of the rotor disk 13 facing away from the stator-side bearing surface 20, likewise adjacent to the radial outer circumference 12' of the rotor device 12, which second bearing surface 22' is likewise of annular design in the radial outer edge region of the rotor disk 13. Opposite the second rotor-side bearing surface 22', a second annular stator-side bearing surface 20' is formed on a bearing block 28 which is supported axially displaceable by means of springs 27, 27' in a bearing block pocket 18 of the stator device 10 and is annular in shape with respect to the rotor axis X. A second bearing gap 21' is formed between the second rotor-side bearing surface 22' and the second stator-side bearing surface 20'.

The annular bearing block 28 is also provided with an inner compressed gas channel arrangement 29, which is in fluid connection with a second compressed gas channel arrangement 29" provided inside the stator device 10 via a flexible and compressible hose connection 29'. The second compressed gas channel arrangement 29" is also supplied with compressed gas, for example with compressed air, in the same way as the first compressed gas channel arrangement 26. Between the inner compressed gas duct arrangement 29 in the bearing block 28 and the second bearing surface 20' on the stator side, a plurality of further micro-holes 24' also extend spaced-apart from one another in the radial direction and spaced-apart from one another in the circumferential direction, which form further gas outlet nozzles 25' where they open into the second bearing gap 21'. In this way, the rotor disk 13 is supported on its two end faces by the double aerostatic bearing 2' in the axial direction.

Figure 4:
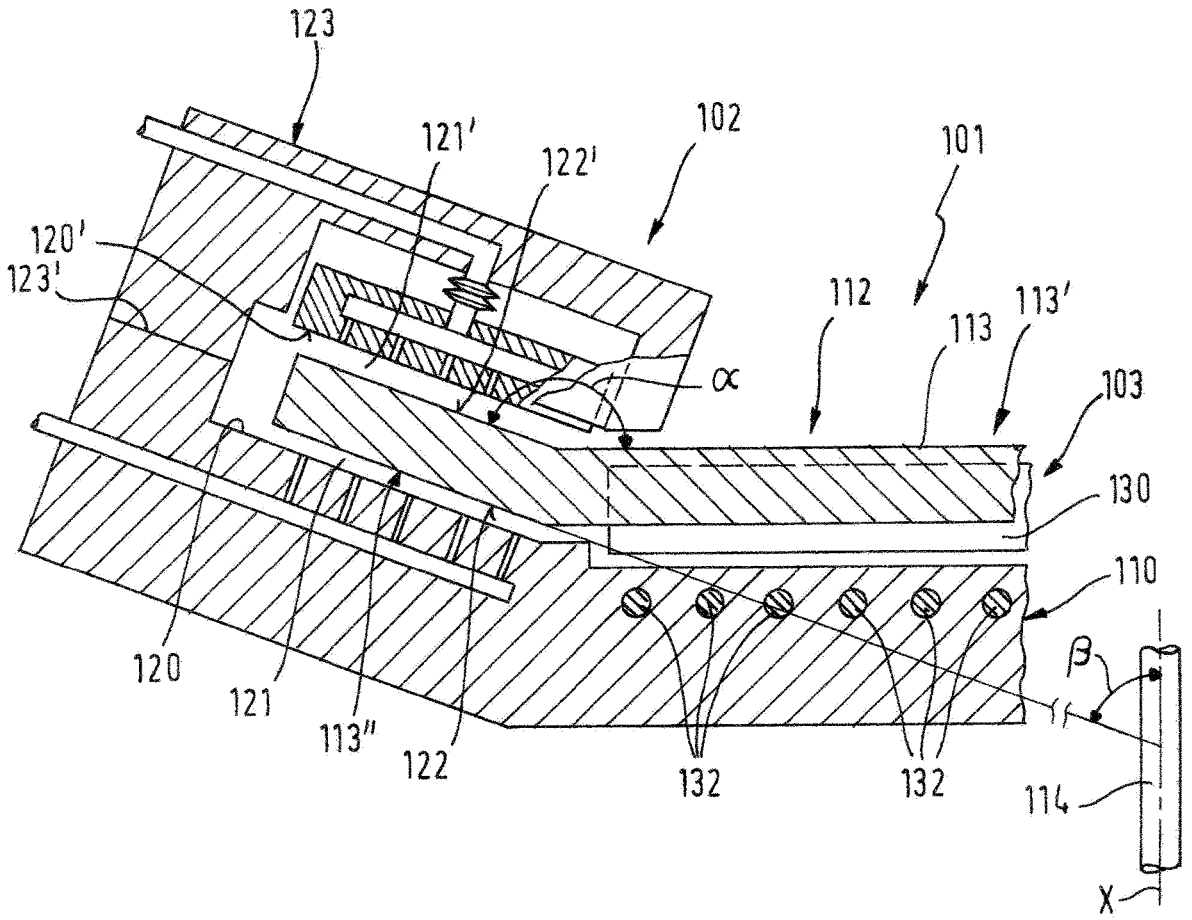
FIG. 4 a third variant of the first exemplary application of the inventive principle to the rotor of an axial flux electric motor.

FIG. 4 shows a version of the double-acting aerostatic bearing 102 of an engine or driven machine 101 according to the invention shown in FIG. 3, modified in the region of the stator device 110. The stator-side bearing surfaces 120, 120' and the rotor-side bearing surfaces 122, 122' are inclined by an acute angle β (advantageously greater than 45° and less than 90°, further advantageously greater than 60° and less than) 90° to the axis of rotation X of the rotor shaft 114. The outer peripheral edge region 113" of the rotor disc 113 also is inclined by this angle with respect to the rotor axis X and forms an obtuse angle α (α=β+) 90° with the central region 113' of the rotor disc 113 of the rotor device 112, which extends at right angles to the rotor axis X and is increased by 90° in relation to β.

A first bearing gap 121 is formed between the first bearing surfaces 120 and 122, and a second bearing gap 121' is formed between the second bearing surfaces 120' and 122'. In all other respects, the structure corresponds to the structure described in connection with FIG. 3. In particular, the electromagnetic active device 103 with the permanent magnets 130 and the electric winding 132—as in the example of FIG. 3—is arranged in the region 113' of the rotor disc 113 extending at right angles to the rotor axis X. The advantage of this modified aerostatic bearing 102 is that radial forces are also supported to a small extent by the aerostatic bearing 102. Predominantly, however, the aerostatic bearing 102 remains a thrust bearing. Here, too, the stator head 123 is U-shaped in cross-section and embraces the circumferential edge region 113" of the rotor disk 113. To facilitate assembly, the U-shaped stator head 123 can also be designed to be separable in this variant, as symbolically indicated by the line 123' in FIG. 4.

Figure 5:
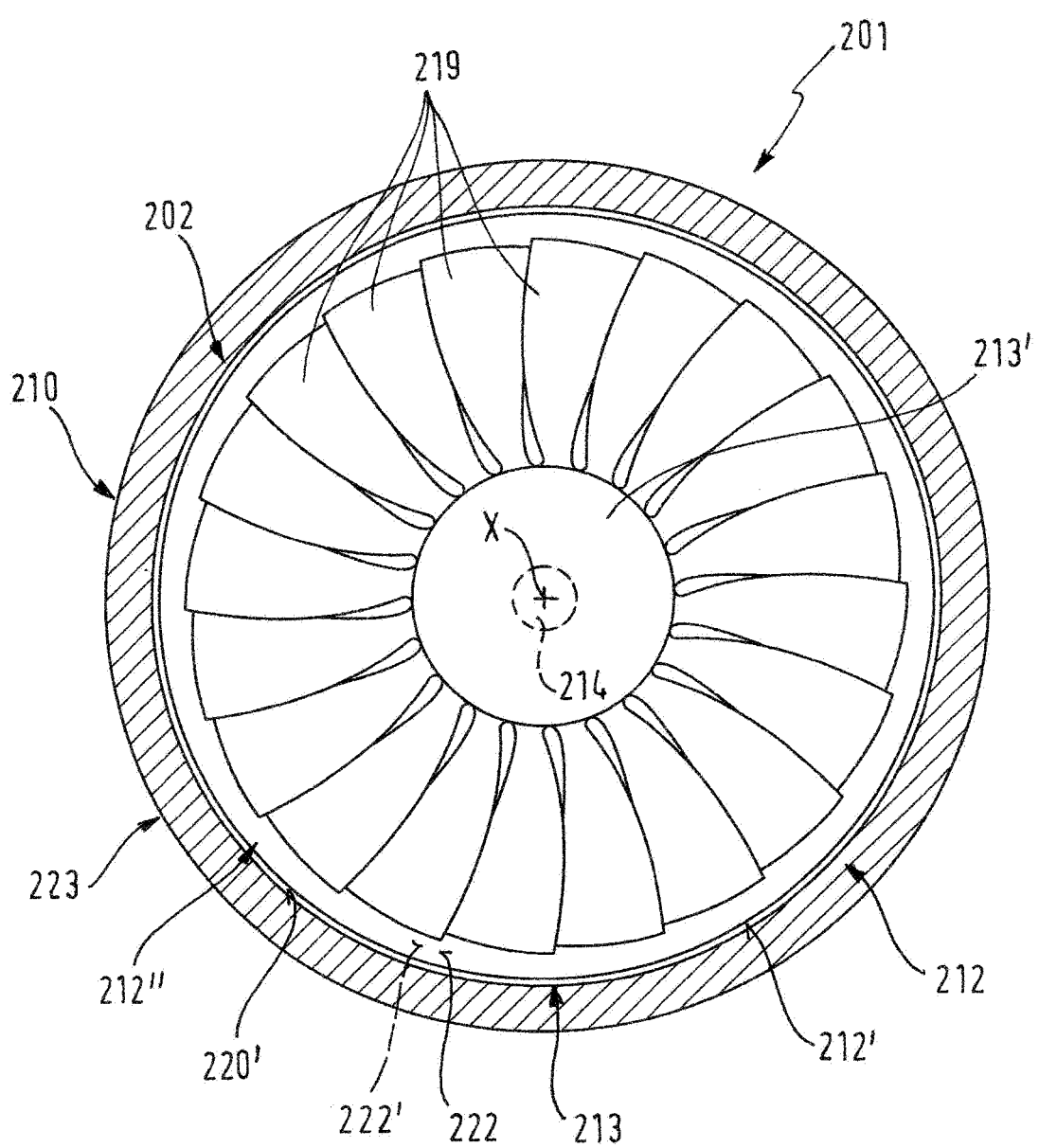
FIG. 5 a second exemplary application of the inventive principle to a blade wheel of the compressor stage of a turbine engine.

FIG. 5 shows a second example of an engine 201 according to the invention forming an aircraft turbine. The rotor device 212 is formed here by a compressor impeller 213 of the aircraft turbine having compressor blades 219. The compressor impeller 213 is supported by means of a hub 213'—like the rotor disk 13 in the example of FIG. 1 and FIG. 3—on a compressor shaft 214 in a torque-resistant manner but free in the axial direction X. The outer circumference 212' of the rotor device 212 is formed by a circumferential bearing ring 212", on the end faces of which the rotor-side annular bearing surfaces 222, 222' are formed. The circumferential edge of the bearing ring 212" is embraced by a stator head 223 of the stator device 210, which is U-shaped in cross-section.

As in the example of FIG. 4, the rotor-side bearing surfaces 222, 222' cooperate with stator-side bearing surfaces, of which only the second stator-side bearing surface 220' is shown in FIG. 5, to form a double-acting aerostatic thrust bearing 202. The cross-section of this thrust bearing 202 is therefore essentially the same as the structure of the double-acting aerostatic thrust bearing 2' shown in FIG. 3. The compressor blades 219 of the compressor impeller 213 are supported in a conventional manner on the hub 213' so as to be pivotable about a respective radial axis. In addition, the individual compressor blades 219 are pivotally supported on the bearing ring 212" at their respective radial ends about the associated radial axis.

Reference numerals in the description and the drawings serve only for a better understanding of the invention and do not limit the scope and spirit of the invention which is exclusively defined by the appended patent claims.

All features described and shown in the individual embodiments of the invention can be used in various combinations when practicing the invention in order to achieve their advantageous effects. The spirit and scope of the invention is defined exclusively by the patent claims and is not limited by the features provided in the description or shown in the drawing figures.

REFERENCE NUMERALS AND DESIGNATIONS

1 Engine or driven machine
1' Engine or driven machine
2 aerostatic bearing
2' double aerostatic bearing
3 electromagnetic active device
3' axial flux electric motor
10 stator device
11 structure
11' rotational bearing
12 rotor device
12' outer circumference of the rotor device
12" inner circumference of the rotor device
13 rotor disc
13' first end face of rotor disc
13' second end face of rotor disc
14 rotor shaft
15 claw pin
16 claw coupling
16' claw
16" claw pocket
17 axial toothing
18 bearing block pocket
20 first stator side bearing surface
20 second stator side bearing surface
21 first bearing gap
21' second bearing gap
22 first rotor side bearing surface
22' second rotor side bearing surface
23 stator head
23.' line
24 microhole
24 microhole
25 gas outlet nozzle
25' gas outlet nozzle
26 discharge gas duct arrangement
26' compressed gas line
27 spring
27' spring
28 bearing block
29 first pressurized gas duct
29' flexible and compressible hose connection
29" second pressure gas duct
30 permanent magnet
32 electrical winding
101 driven machine
102 aerostatic bearing
110 stator device
112 rotor device
113 rotor disc
113' central area
113" peripheral edge area
114 rotor shaft
120 stator side bearing surface
120' stator side bearing surface
121 bearing gap
121' bearing gap
122 rotor side bearing surface
122' rotor side bearing surface
123 stator head
123' line
130 permanent magnet 132 electric winding
201 engine and driven machine
202 aerostatic thrust bearing
202' stator side bearing surface
210 stator device
212 rotor device
212' outer circumference
212" bearing ring
213 compressor impeller (impeller)
213' hub
214 compressor shaft (rotary shaft)
219 compressor blades (turbine blades)
220' stator side bearing surface
222 ring rotor side bearing surface
222' annular rotor side bearing surface
223 stator head
X rotation axis
X' rotation axis

What is claimed is:

1. An electric motor or driven machine, comprising:
a structure;
a stator device fixed at the structure;
a rotor device including an outer circumference; and
a rotor shaft coupled or couplable to the rotor device for torque transmission and supported rotatable about an axis of rotation and substantially axially fixed in or on the structure,
wherein the rotor device is axially supported proximal to its outer circumference in an axis-parallel direction by an aerostatic bearing including a stator-side bearing surface formed on the stator device and a rotor-side bearing surface formed on the rotor device and a bearing gap formed between a stator side bearing surface and a rotor side bearing surface,
wherein the rotor device is formed by a rotor disc,
wherein circumferentially spaced and radially extending permanent magnets of an electromagnetic operating device are provided at the rotor disk, radially inside from the aerostatic bearing,
wherein electrical windings of the electromagnetic operating device are provided in the stator device and configured to interact with the permanent magnets provided at the rotor disc,
wherein the rotor device includes a first rotor-side bearing surface on a first axial side of the rotor device and a second rotor-side bearing surface on a second axial side of the rotor device facing away from the first axial side,
wherein the first stator-side bearing surface is arranged opposite the rotor-side bearing surface,
wherein a first bearing gap is formed between the rotor-side bearing surface and the stator-side bearing surface,
wherein the second stator-side bearing surface is arranged opposite the second rotor-side bearing surface,
wherein a second bearing gap is formed between the second rotor-side bearing surface and the second stator-side bearing surface, and
wherein the first stator-side bearing surface or the second stator-side bearing surface is movable in the direction parallel to the axis of rotation or includes bearing elements which are movable in the direction parallel to the axis of rotation.

2. The electric motor or driven machine according to claim 1, wherein the stator-side bearing surface or the rotor-side bearing surface includes a plurality of gas outlet nozzles formed as micro-holes which open into the bearing gap.

3. The electric motor or driven machine according to claim 1, wherein the stator-side bearing surface includes a plurality of gas outlet nozzles formed as micro-holes which open into the bearing gap.

4. The electric motor or driven machine according to claim 1, wherein the stator-side bearing surface and a rotor-side bearing surface are each arranged in a plane orthogonal to the axis of rotation.

5. The electric motor or driven machine according to claim 1, wherein the stator-side bearing surface and the rotor-side bearing surface are each arranged in a plane which extends at an acute angle relative to the axis of rotation.

6. The electric motor or driven machine according to claim 1, wherein the first stator-side bearing surface, the second stator-side bearing surface, a first rotor side bearing and a second rotor side bearing surface are each aligned parallel to one another.

7. The electric motor or driven machine according to claim 1, wherein the rotor device is axially supported only proximal to its outer circumference by the aerostatic bearing and is supported axially movable relative to the rotor shaft.

8. The electric motor or driven machine according to claim 1, wherein the rotor device is coupled to the rotor shaft by a coupling so that the rotor device is movable in the axial direction parallel to the axis of rotation or in the radial direction at right angles relative to the axis of rotation.

9. The electric motor or driven machine according to claim 1, wherein the electric motor or driven machine forms an electric axial flux motor.

10. The electric motor or driven machine according to claim 1, wherein the electric motor or driven machine forms an electric axial flux generator.

11. An engine or driven machine, comprising:
a structure;
a stator device fixed at the structure;
a rotor device including an outer circumference; and
a rotor shaft coupled or couplable to the rotor device for torque transmission and supported rotatable about an axis of rotation and substantially axially fixed in or on the structure,
wherein the rotor device is axially supported proximal to its outer circumference in an axis-parallel direction by an aerostatic bearing including a stator-side bearing surface formed on the stator device and a rotor-side bearing surface formed on the rotor device and a bearing gap formed between the stator side bearing surface and the rotor side bearing surface,
wherein the rotor device is formed by an impeller of a turbine, which includes a multiplicity of turbine blades which extend in the radial direction and are mounted to or supported on a hub rotatably coupled to the rotor shaft,
wherein radially outer end sections of the turbine blades are connected or coupled to a bearing ring including the rotor-side bearing surface, or
wherein radially outer end sections of the turbine blades are provided with at least one bearing surface portion including the rotor-side bearing surface,
wherein the rotor device includes a first rotor-side bearing surface on a first axial side of the rotor device and a second rotor-side bearing surface on a second axial side of the rotor device facing away from the first axial side,
wherein the first stator-side bearing surface is arranged opposite the rotor-side bearing surface,
wherein a first bearing gap is formed between the rotor-side bearing surface and the stator-side bearing surface, wherein the second stator-side bearing surface is arranged opposite the second rotor-side bearing surface, wherein a second bearing gap is formed between the second rotor-side bearing surface and the second stator-side bearing surface, and wherein the first stator-side bearing surface or the second stator-side bearing surface is movable in the direction parallel to the axis of rotation or includes bearing elements which are movable in the direction parallel to the axis of rotation.

12. The engine or driven machine according to claim 11, wherein the rotor device is formed by a compressor rotor of a gas turbine or an aircraft turbine.

13. The engine or driven machine according to claim 11, further comprising:

a plurality of pairs of stators and rotors arranged one behind the other in an axial direction, wherein at least one of the rotors is coupled to the rotor shaft for torque transmission, and wherein at least one of the rotors is coupled to an additional rotor shaft for torque transmission.

* * * * *